United States Patent
Shankaranarayanan et al.

(10) Patent No.: US 9,021,505 B2
(45) Date of Patent: Apr. 28, 2015

(54) MONITORING MULTI-PLATFORM TRANSACTIONS

(75) Inventors: Kartik Shankaranarayanan, Framingham, MA (US); Aditya Pandit, Northborough, MA (US); Mark Mogayzel, Storrs, CT (US); Sushmita Sengupta, Framingham, MA (US)

(73) Assignee: CA, Inc., New York, NY (US)

( * ) Notice: Subject to any disclaimer, the term of this patent is extended or adjusted under 35 U.S.C. 154(b) by 2056 days.

(21) Appl. No.: 11/952,825

(22) Filed: Dec. 7, 2007

(65) Prior Publication Data

US 2009/0150908 A1 Jun. 11, 2009

(51) Int. Cl.
*G06F 9/46* (2006.01)
*G06F 9/44* (2006.01)
*G06F 9/50* (2006.01)
*G06F 9/54* (2006.01)
*G06F 11/34* (2006.01)

(52) U.S. Cl.
CPC .............. *G06F 9/466* (2013.01); *G06F 9/5055* (2013.01); *G06F 9/54* (2013.01); *G06F 11/3404* (2013.01); *G06F 11/3495* (2013.01); *G06F 2209/542* (2013.01); *G06F 2209/509* (2013.01)

(58) Field of Classification Search
CPC .......... G06F 9/466; G06F 9/5055; G06F 9/54
See application file for complete search history.

(56) References Cited

U.S. PATENT DOCUMENTS

| 6,260,187 | B1 | 7/2001 | Cirne | |
|---|---|---|---|---|
| 6,564,342 | B2 | 5/2003 | Landan | |
| 7,194,664 | B1 * | 3/2007 | Fung et al. | 714/45 |
| 7,512,935 | B1 | 3/2009 | Cobb | |
| 8,028,200 | B2 * | 9/2011 | Ivanov et al. | 714/45 |
| 2002/0083163 | A1 | 6/2002 | Collazo | |

OTHER PUBLICATIONS

Distributed Statistic Records Shared Library; Nov. 25, 2002; 46 pages.*
Eichelsdoerfer, Markus, "Distributed Statistic Records Shared Library," [http://www.sdn.sap.com], Nov. 25, 2002, 46 pages.

* cited by examiner

*Primary Examiner* — H S Sough
*Assistant Examiner* — Kimberly Jordan
(74) *Attorney, Agent, or Firm* — Vierra Magen Marcus LLP

(57) ABSTRACT

A monitoring system monitors and provides performance data for a transaction performed by multiple applications over different platforms. A request for a multi-platform transaction such as an SAP transaction is received by a first application, such as a JAVA application, on a first platform. Processing of the transaction triggers the first application to invoke a second application, such as an ABAP application, on a second platform. Code inserted into the first application intercepts the invocation of the second application, remotely executes a function on the second platform while providing a transaction identifier to an application server providing the second platform, and returns control back to the first application, which proceeds to invoke the second application to complete the multi-platform transaction. Performance data for the first application and the second application is accessed and correlated based on the transaction identifier to enable reporting of transaction performance over the two platforms.

20 Claims, 13 Drawing Sheets

Sample SSR Record

| UUID of RFC Connection | Dest. | Time Stamp | Function Module Name | Prog. Name | Step Type | Prog. Line | Run time | Exec. Time | Wait Time | Data Sent | Count. | Recd Data | Count. | Call No. |
|---|---|---|---|---|---|---|---|---|---|---|---|---|---|---|
| B2B5D0 | 227_01 | 071015 120004 | BAPI_XMI_LOGON | SAPLSXMI | T | 0 | 1 | 1 | 0 | 1,913 | 0 | 238 | 0 | 1 |
| B2B5D0 | 227_01 | 071015 120004 | DYN_FUNC_ABC | SAPLSXMI | T | 0 | 1 | 1 | 1 | 1,326 | 0 | 213 | 0 | 2 |
| B2B5D0 | 227_01 | 071015 120004 | BAPI_SYSTEM_GETLIST | SAPLSXMI | T | 0 | 1 | 1 | 1 | 1,556 | 0 | 322 | 0 | 3 |
| B2B5D0 | 227_01 | 071015 120004 | BAPI_XMI_LOGOFF | SAPLSXMI | T | 0 | 0 | 0 | 0 | 1,258 | 0 | 64 | 0 | 4 |
| B2B5D0 | 227_01 | 071015 120004 | SYSTEM_RESET_SERVER | SAPLSXMI | T | 0 | 0 | 0 | 14 | 146 | 0 | 28 | 0 | 5 |

MONITORING MULTI-PLATFORM TRANSACTIONS

BACKGROUND

The growing presence of the Internet as well as other computer networks such as intranets and extranets has brought many new applications in e-commerce, education and other areas. Organizations increasingly rely on such applications to carry out their business or other objectives, and devote considerable resources to ensuring that the applications perform as expected. To this end, various application management techniques have been developed.

Some network application monitoring systems are configured to monitor applications on a particular platform. For example, some application monitoring systems are configured to monitor Java applications. Though these systems may monitor several applications provided on a common platform, many are not well suited to monitor transactions which execute across different platforms. As a result, any transaction that requires processing over applications implemented on different platforms cannot be sufficiently monitored with a monitoring system configured to monitor only one platform.

SUMMARY

The technology described herein pertains to a monitoring system that monitors transactions which span over several platforms, such as a SAP (Systems Application and Products) transaction which requires processing by applications on a Java platform and an ABAP (Advanced Business Application Programming) platform. When monitoring a SAP transaction, the Java application is monitored by a monitoring system installed on a Java application server. To monitor the ABAP application, an ABAP application server is configured with one or more files which utilize internal ABAP transaction monitoring facilities. Runtime performance data for the transaction that ran on both (Java and ABAP) platforms is provided with a unique identifier used to identify and correlate the performance data for the different platforms.

An ABAP server may be configured to generate a set of records for methods executed on the ABAP server. The records may specify information for a method or a set of methods executed on the ABAP server, including the method name(s), response time(s), time executed and other data, in the order the methods or other processes were performed. When a JAVA application detects that an ABAP application is to be invoked to process an SAP transaction, code inserted into the JAVA application may remote execute a method on the ABAP transaction. The name of the invoked transaction may be a unique identifier associated with the SAP transaction, which is stored with runtime performance data for the JAVA application as well. A record for the remotely executed ABAP transaction will be included in the records generated by the ABAP server, and may include transaction identification information. After the remotely executed transaction is performed, execution of the code inserted into the JAVA application ends and the JAVA application may invoke the ABAP application as needed to process the SAP transaction. After the processing of the ABAP transaction is completed by the ABAP application, the ABAP server records will include sequentially consecutive records for the remotely executed ABAP transaction with the transaction identifier and the method invoked to process the SAP transaction. Because the records are provided in the order performed, the record(s) which are a part of the set that includes the invoked record with the identifier are identified as the records associated with the SAP transaction.

Performance data associated with JAVA application components and performance data associated with executed ABAP methods are correlated using a random GUID. The random GUID is placed in the dynamic transaction name as part of the transaction invoked on the ABAP server and included in the performance data generated by an agent on the Java application server. The correlated performance data for the JAVA application and the ABAP application are then reported.

In an embodiment, the present technology may first receive a request to perform a transaction by a first application. The first application may be provided on a first platform. A determination is then made that the transaction should be processed by a second application provided on a second platform. A transaction identifier is then sent by the first application to the second application. The second application is then invoked to process a second request by the first application. The second request is generated in response to receiving the first request by the first application. Runtime application data associated with performance of the first application and second application and including the transaction identifier is then reported.

An embodiment may include a system for monitoring a transaction that includes a first application, a first agent and a second agent. The first application may be provided on a first application server which implements a first platform and may process a request received from a client. The first application may initiate a multi-platform transaction to invoke a second application. The first agent may generate a transaction identifier for the request and provide a first set of performance data for the first application. The second agent may be in communication with a second application on a second application server implementing a second platform, may retrieve a second set of performance data from the second application server, and remotely execute a first function on the second application server. The first set of performance data and the second set of performance data include the transaction identifier.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 12 is an example of an SSR record with a generic dynamic function record.

DETAILED DESCRIPTION

Figure 1:
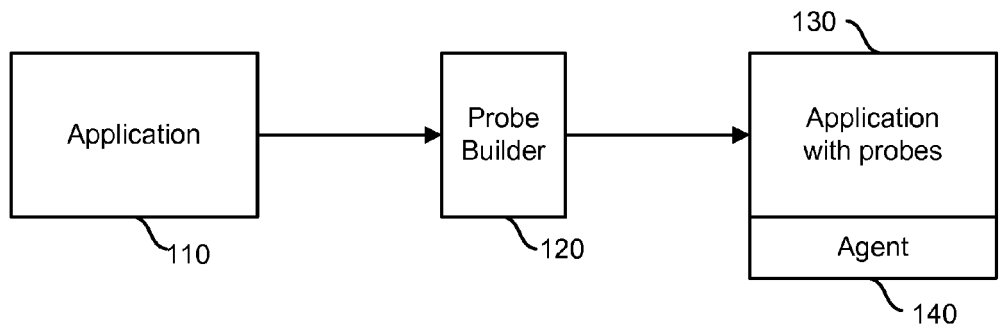
FIG. 1 is a block diagram illustrating how byte code for an application is instrumented.

An application monitoring system monitors transactions that are performed by applications on several platforms. For example, the application monitoring system may monitor a SAP transaction which requires processing by applications on a Java platform and an ABAP platform. A Java application can be monitored by code installed on a Java application server and an ABAP application server can be configured with import of one or more ABAP functions which utilize internal ABAP server monitoring techniques. Runtime performance data for both applications is provided with a unique identifier used to identify and correlate the performance data for the different applications.

Performance data associated with the performance of each application component is generated for each application involved in an SAP transaction. The mechanism for generating the performance data may differ for each application type, but is correlated using a transaction identifier. Performance data for a JAVA application can be generated by code inserted into the application. The inserted code provides data to an agent which aggregates and transmits performance data to a manager. The performance data may be populated with a transaction identifier that indicates a portion of the performance data is associated with an SAP transaction or other transaction that is performed by applications on different platforms. This is discussed in more detail below.

ABAP server may be configured to generate performance data as a set of records for ABAP functions executed on the ABAP server. The records may specify information for a function executed on the ABAP server, including the function name, response time, time executed and other data, in the order the functions or other ABAP code were executed on the ABAP server. When a JAVA application detects that an ABAP application is to be invoked to process an SAP transaction, code inserted into the JAVA application may remotely execute a method on the ABAP transaction. A record for the remotely executed ABAP transaction will be included in the records generated by the ABAP server, and may include transaction identification information (for example, the name of the remotely executed transaction on the ABAP server may include a transaction identifier). After the remotely executed transaction is performed, the JAVA application may invoke the ABAP application as needed to process the SAP transaction. After the processing of the SAP transaction is completed by the ABAP application, the ABAP server may provide a set of records that include the remotely executed ABAP transaction with the transaction identifier and the method(s) invoked to process the SAP transaction. The set of one or more records of which the invoked record with the transaction identifier is a part of is identified as the set of records associated with the SAP transaction.

Performance data for JAVA application components and ABAP functions are correlated using a random GUID inserted into both sets of data. The random GUID is placed in a transaction name of the transaction invoked on the ABAP server and populated into the performance data generated by an agent on the Java application server. The set of records, which contains the record with the transaction identifier, is the relevant ABAP application performance data. Both sets of performance data are retrieved and correlated. The correlated performance data for the SAP transaction is then reported.

In the discussion below, references may be made to a transaction, such as an SAP transaction, that is performed by applications on more than one platform. References to an SAP transaction are discussed for example purposes only and should not be intended to limit the platforms that the present technology can be applied to.

In one embodiment, the technology herein can be used to monitor behavior of an application on an application server using bytecode instrumentation. The technology herein may also be used to access information from the particular application. To monitor the application, an application management tool may instrument the application's object code (also called bytecode). FIG. 1 depicts an exemplar process for modifying an application's bytecode. FIG. 1 shows Application 110, Probe Builder 120, Application 130 with probes and Agent 140. Application 130 includes probes used to access information from the application, and application 110 is the application before the probes are added. Application 110 can be a Java application or a different type of application.

Probe Builder 120 instruments (e.g. modifies) the bytecode for Application 110 to add probes and additional code to Application 110 in order to create Application 130. The probes may measure specific pieces of information about the application without changing the application's business logic. Probe Builder 120 also generates Agent 140. Agent 140 may be installed on the same machine as Application 130 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein doesn't actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 2:
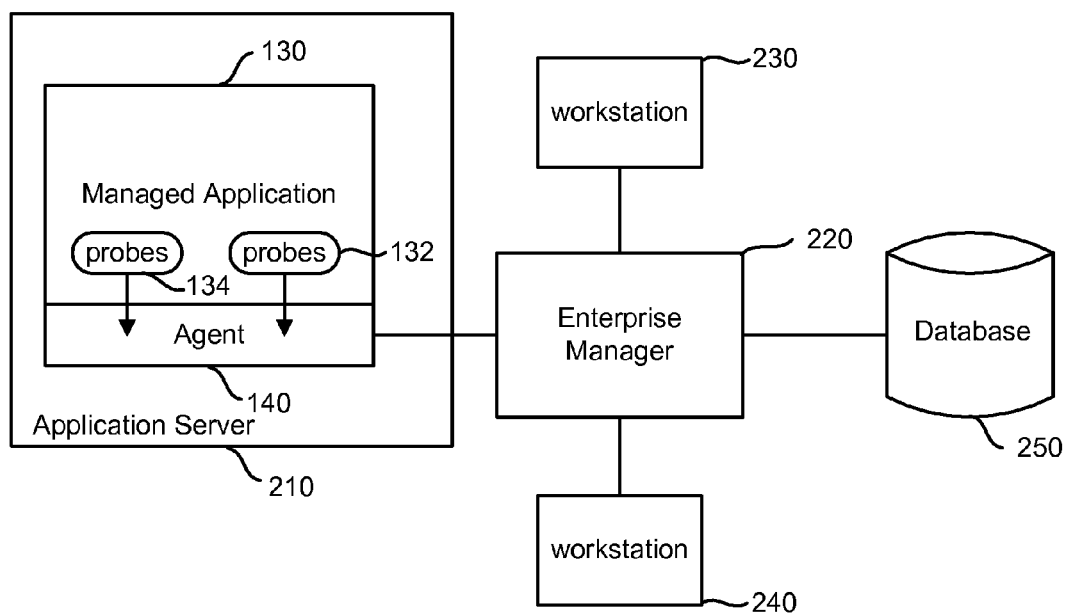
FIG. 2 is a block diagram of a system for monitoring an application.

FIG. 2 is a conceptual view of the components of the data reporting technology. In addition to managed Application 140 with probes 132 and 134, FIG. 2 also depicts Enterprise Manager 220, database 250, workstation 230 and workstation 240. As a managed application runs, probes (e.g. 132 and/or 134) relay data to Agent 140. In one embodiment, probes 132 and 134 may be implemented in objects and other code that write data, change data or otherwise cause the state of an application server 210 to change. Agent 140 then collects, summarizes and sends the data to Enterprise Manager 220. In some embodiments, Agent 140 may perform additional actions, such as invoking a method on another application, performing initialization tasks, and other actions. This is discussed in more detail below.

Enterprise Manager 220 receives performance data from managed applications via Agent 140, runs requested calculations, makes performance data available to workstations 230-240 and optionally sends performance data to database 250 for later analysis. The workstations (e.g. 230 and 240) provide the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections. In one embodiment, workstations 230-240 and database 250 are not used or needed to generate synthetic transactions.

In one embodiment of the system of FIG. 2, each of the components is running on different machines. That is, workstation 230 is on a first computing device, workstation 240 is on a second computing device, Enterprise Manager 220 is on a third computing device, and Managed Application 130 is running on a fourth computing device. In another embodiment, two or more (or all) of the components are operating on the same computing device. For example, Managed Application 130 and Agent 140 may be on a first computing device, Enterprise Manager 220 on a second computing device and a workstation on a third computing device. Alternatively, all of the components of FIG. 2 can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 3:
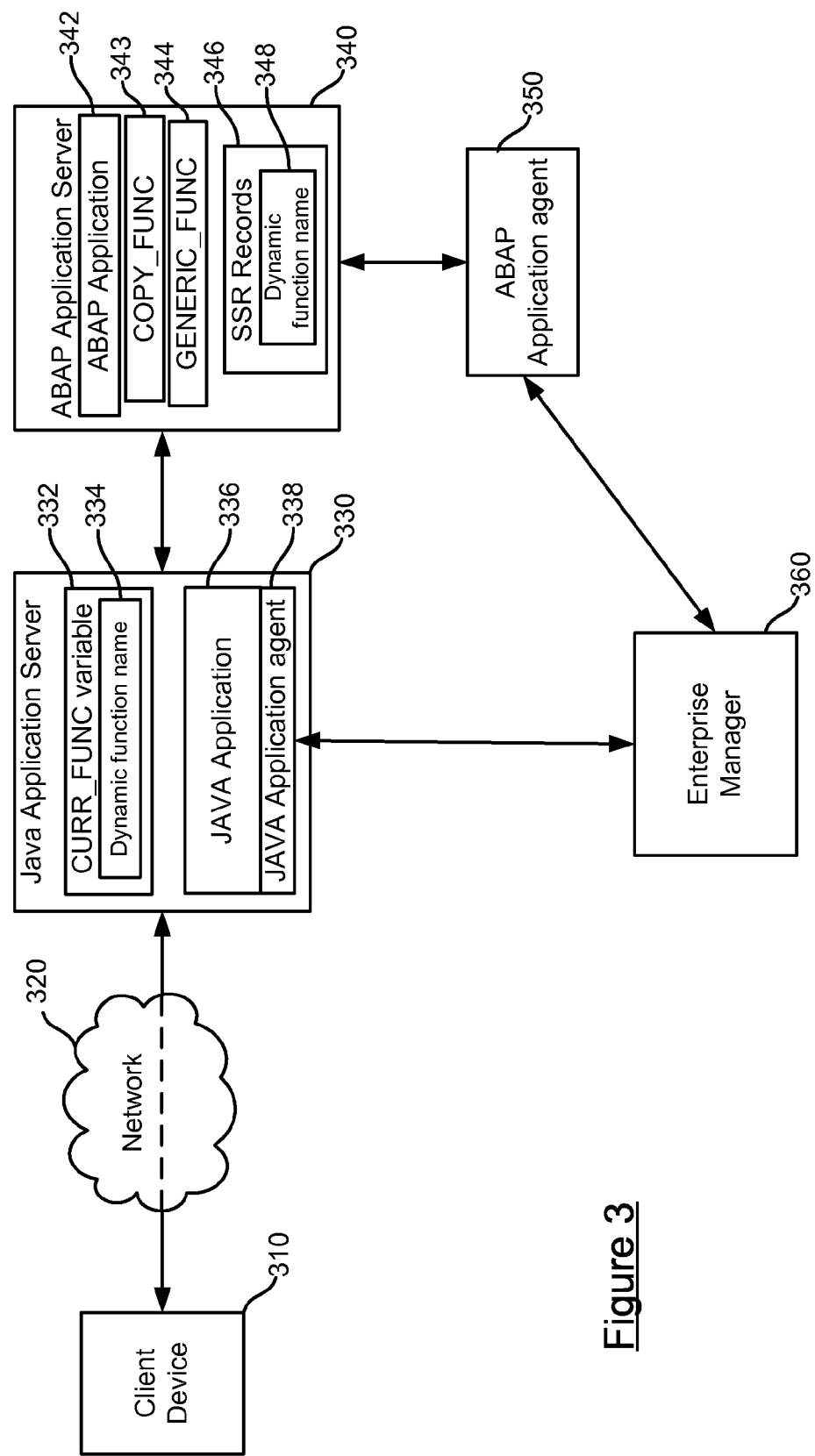
FIG. 3 is a block diagram of an embodiment of a system for monitoring transactions occurring over multiple application servers.

FIG. 3 is a block diagram of an embodiment of a system for monitoring transactions occurring over multiple application servers. FIG. 3 includes client device 310 in communication with Java application server 330 over network 320. Java application server 330 is in communication with ABAP application server 340 and enterprise manager 360. ABAP application agent 350 is in communication with ABAP application server 340 and enterprise manager 360. Enterprise manager 360 is in communication with ABAP application agent 350 and Java application server 330.

Network 320 may be implemented as the Internet or other WAN, a LAN, intranet, extranet, private network or other network or networks. Client device 310 may be any machine which may transmit a request to application server 330.

Application server 330 includes Java application 336, agent 338 and a function variable 332. Java application 336 may process requests received from client device 310 over network 320 and may be implemented as a managed application, such as managed application 130 of FIG. 2. Agent 338 may be in communication with application 336, receive data from probes installed in application 336 (probes not illustrated in FIG. 3) and send runtime performance data to enterprise manager 360. Agent 338 may be implemented as agent 140 of FIG. 2.

Function variable 332 stored on application server 330 may contain a dynamic function name 334. The dynamic function name 334 may be a name generated at least in part from a randomly generated global unique identifier (GUID). The random GUID may identify a particular transaction, such as a SAP transaction, that is performed by applications on different platforms or by different servers.

ABAP application server 340 may include SSR records 346, a copy function 343, a generic function 344 and ABAP application 342. ABAP application server 340 may receive, process and respond to requests received from Java application 336 to invoke ABAP application 342. ABAP application may be invoked to process requests and perform other functions. Function 344 may be any function, method or process for which its execution results in creation of a unique or other record 348 in SSR records 346. For example, function 344 may be a function that copies itself into another specified function. In some embodiments, function 344 may be remotely imported into the ABAP server 340.

SSR records 346 are a set of records generated by ABAP server 340 for functions, methods and processes executed by one or more ABAP applications on ABAP server 340. Each record contains the method name, execution time, response time and other data for the method executed. SSR records 346 contain a record for execution of function 344 where the function has a dynamic function name 348. As mentioned above, the dynamic function name is a function name that includes a random GUID, which may be a string, number or some other identifier used to identify a SAP transaction and correlate performance data for applications on different platforms that perform the transaction.

ABAP application agent 350 may import function 344 into ABAP application server 340, retrieve SSR records from application server 340 and perform other functionality, including functions performed by agent 338 of Java application server 330.

Enterprise manager 360 may receive performance data from JAVA agent 338 and ABAP application agent 350 and correlate the sets of performance data associated with each SAP transaction performed by the system of FIG. 3. The correlated performance data can then be stored to a database, reported directly to a user or to one or more workstations, or otherwise processed by Enterprise Manager 360. Enterprise Manager 360 may be implemented similar to enterprise manager 220 of the system of FIG. 2.

Figure 4:
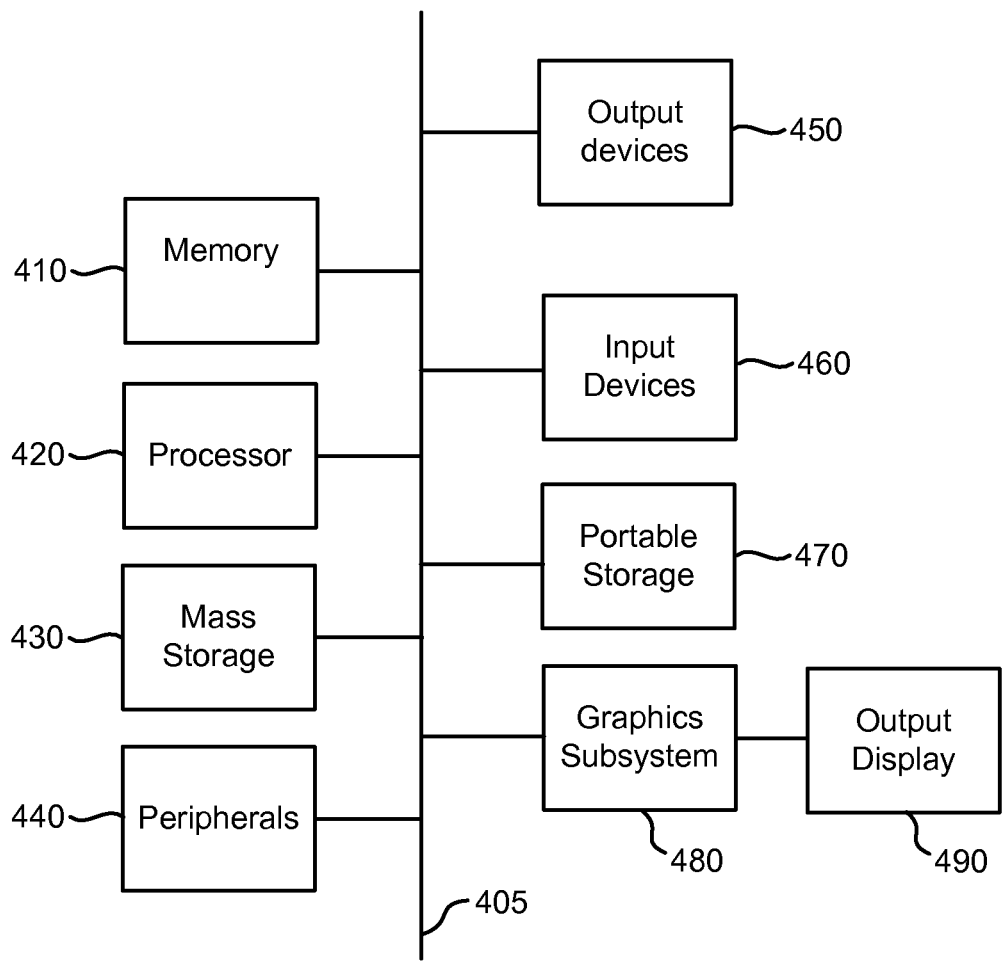
FIG. 4 is a block diagram of an embodiment of a computing system.

FIG. 4 is a block diagram of an embodiment of a computer system. In some embodiments, the computing system of FIG. 4 may be used to implement client device 310, Java application server 330, ABAP application server 340, ABAP application agent 350, enterprise manager 220, work stations 230 and 240 and database 250.

The computer system of FIG. 4 includes one or more processors 420 and main memory 410. Main memory 410 stores, in part, instructions and data for execution by processor unit 420. If the system of the present invention is wholly or partially implemented in software, main memory 410 can store the executable code when in operation. The system of FIG. 4 further includes a mass storage device 430, peripheral device(s) 440, output devices 450, user input device(s) 460, portable storage medium drive(s) 470, a graphics subsystem 480 and an output display 490. For purposes of simplicity, the components shown in FIG. 4 are depicted as being connected via a single bus 405. However, the components may be connected through one or more data transport means. For example, processor unit 420 and main memory 410 may be connected via a local microprocessor bus, and the mass storage device 430, peripheral device(s) 440, portable storage medium drive(s) 470, and graphics subsystem 64 may be connected via one or more input/output (I/O) buses. Mass storage device 430, which may be implemented with a magnetic disk drive or an optical disk drive, is a non-volatile storage device for storing data and instructions for use by processor unit 420. In one embodiment, mass storage device 430 stores the system software for implementing the present invention for purposes of loading to main memory 410.

Portable storage medium drive 470 operates in conjunction with a portable non-volatile storage medium, such as a floppy disk, to input and output data and code to and from the computer system of FIG. 4. In one embodiment, the system software for implementing the present invention is stored on such a portable medium, and is input to the computer system via the portable storage medium drive 470. Peripheral device(s) 440 may include any type of computer support device, such as an input/output (I/O) interface, to add additional functionality to the computer system. For example, peripheral device(s) 440 may include a network interface for connecting the computer system to a network, a modem, a router, etc.

User input device(s) 460 provides a portion of a user interface. User input device(s) 460 may include an alpha-numeric keypad for inputting alpha-numeric and other information, or a pointing device, such as a mouse, a trackball, stylus, or cursor direction keys. In order to display textual and graphical information, the computer system of FIG. 4 includes graphics subsystem 480 and output display 490. Output display 490 may include a cathode ray tube (CRT) display, liquid crystal display (LCD) or other suitable display device. Graphics subsystem 480 receives textual and graphical information, and processes the information for output to display 490. Additionally, the system of FIG. 4 includes output devices 450. Examples of suitable output devices include speakers, printers, network interfaces, monitors, etc.

The components contained in the computer system of FIG. 4 are those typically found in computer systems suitable for use with the present invention, and are intended to represent a broad category of such computer components that are well known in the art. Thus, the computer system of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 5:
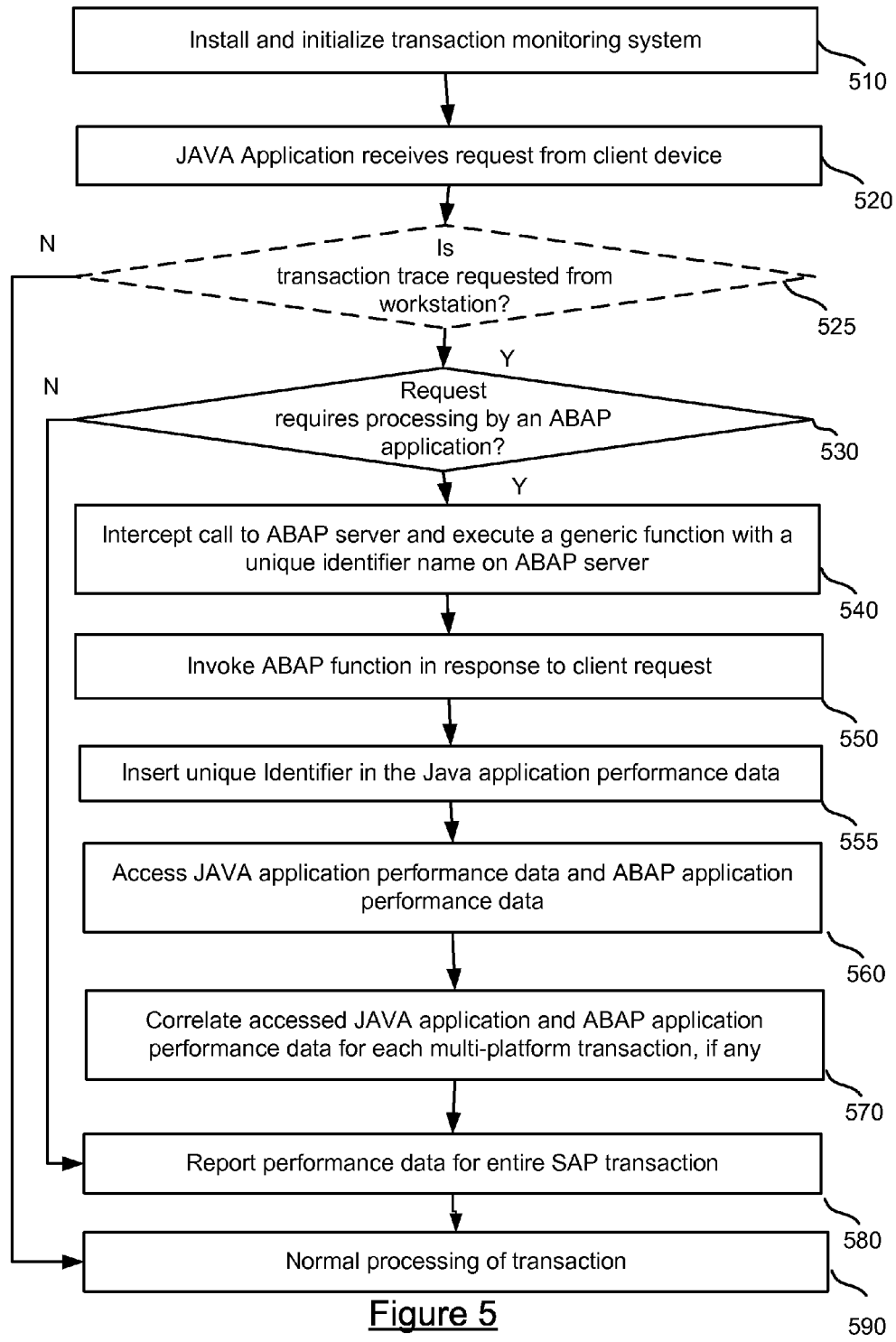
FIG. 5 is a flowchart of an embodiment of a method for reporting end to end transactions in SAP transactions.

FIG. 5 is a flowchart of an embodiment of a method for reporting end to end transactions for an SAP system. First, a transaction monitoring system is installed and initialized at step 510. Installing and initializing the system may include using byte-code instrumentation to install one or more agents, installing other files, and executing code to perform initialization tasks. In some embodiments, agents are configured for one or more Java applications and ABAP applications. One or more of the agents may perform initialization tasks, such as importing files and creating files. Installing and initializing a transaction monitoring system is discussed in detail below with respect to FIG. 6.

Java application 336 receives a request initiated from client device 310 at step 520. The request from client 310 can be initiated from a user or a machine, received by application server 330 and routed to Java application 336 by an interface for JAVA application server 330. In some embodiments, a determination is made to see if a workstation has requested a transaction trace to the Java and/or ABAP agents in step 525. The Workstation may be extended to initiate collection of transaction trace data on the ABAP Agent 350. If a transaction trace has not been requested then the application proceeds through its normal processing on the Java Application Server in step 590. If transaction trace is requested, then the method continues to step 530. In some embodiments, this step is optional.

A determination is made as to whether the request requires processing by ABAP application server 340 at step 530. A request requires processing by the ABAP application server if ABAP application 342 is required to complete a transaction initiated by the request. For example, if the request is for an SAP transaction, ABAP application 342 is required to complete the transaction. In some embodiments, if the request does not require processing by an ABAP server, the method of FIG. 5 continues to step 580. In some embodiments, if the request does not require processing by an ABAP application, the method of FIG. 5 continues to step 560. In this embodiment, an attempt may still be made to correlate JAVA application and ABAP application performance data.

If at step 530 the request does require processing by an ABAP application, Java application server 330 generates a call to invoke ABAP application 342 on the ABAP application server. The call to the ABAP application is intercepted and a generic function is executed on the ABAP server at step 540. The generic function may have a unique identifier name. The call can be intercepted by code added to Java application 336, such as probes 132 or 134 inserted into application 336 by byte code instrumentation or in some other manner. In some embodiments, the step of determining whether the request requires a transaction be performed at least in part by an ABAP application (or some other application on a platform that differs from the JAVA platform) is implemented by intercepting a call to the ABAP server. Thus, the step of intercepting a call at step 540 may be incorporated into step 530, in some embodiments.

Once the call to the ABAP server is intercepted, a generic function may be executed on the ABAP server before continuing with the call to the ABAP server to process the request received at step 520. Intercepting a call to an ABAP server and executing a generic function on the ABAP server before allowing the call to complete is discussed in more detail below with respect to FIG. 8.

An ABAP function within ABAP application 340 is invoked by Java application 338 to process the client request at step 550. Thus, application 342 on the ABAP application server is invoked by Java application 336 to resume performing the transaction initiated in response to the request received from client device 310. In some embodiments, the ABAP function to invoke may be specified in the client request. The ABAP application server is invoked at step 550 after the generic function on ABAP server call has been completely executed. After invoking the ABAP application, ABAP application 342 processes the call and transmits results to the component of JAVA application 336 which called the ABAP server. Next, Java application agent 338 inserts the name of the generic function 344 as the unique identifier for the transaction in the Java application performance data at step 555.

After invoking ABAP application 340, performance data for the Java application and ABAP application are accessed at step 560. Performance data for the portion of the transaction performed by JAVA application components is provided to Enterprise Manager 360 by agent 338 on Java application server 330. Performance data for ABAP application components is generated by ABAP server 340 as a set of SSR records. The SSR records are retrieved by ABAP agent 350 and transmitted to Enterprise Manager 360. Accessing application performance data for the Java application and ABAP application is discussed in more detail below with respect to FIG. 10.

The accessed performance data is correlated for each multi-platform transaction, such as a SAP transaction, at step 570. The data may be correlated using a random GUID contained within each set of performance data. For example, with respect to a SAP transaction, the Java application performance data may include the GUID associated with the performance of JAVA application components that perform the SAP transaction. The ABAP application performance data may include the GUID incorporated into a function name listed in the SSR records, wherein the set of one or more records with the random GUID is associated with ABAP application components that perform the SAP Transaction. Correlating accessed Java application and ABAP application performance data is discussed in more detail below with respect to FIG. 11.

After data correlation, the performance data for the entire SAP transaction is reported at step 580 and then normal processing of the application is resumed in step 590. The performance data may be reported through several mediums and/or mechanisms, including a pager, email, a GUI or in some other manner. In particular, the performance data may be reported to a user through a graphical user interface provided by a workstation in communication with enterprise manager 360.

Figure 6:
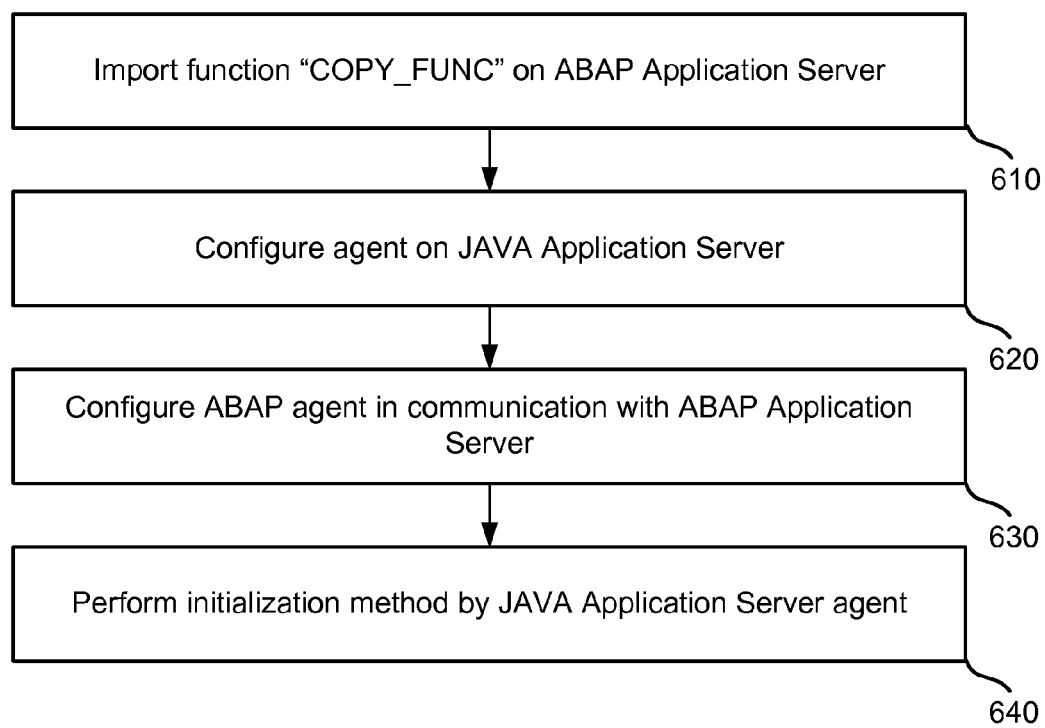
FIG. 6 is a flowchart of an embodiment of a method for installing and initializing a transaction monitoring system.

FIG. 6 is a flowchart of an embodiment of a method for installing and initializing a transaction monitoring system. In some embodiments, the method of FIG. 6 provides more detail for step 510 of the method of FIG. 5. First, a function is imported on ABAP application server 340 at step 610. The imported function may be remotely executed to make a copy of itself into another function. For example, the import function may be called "COPY_FUNC" which copies itself into a second function having an existing function name. Execution of the "COPY_FUNC" function or other function will result in generation of a record to include in SSR records 346.

After importing the function, an agent is configured on Java application server 330 at step 620. Configuring an agent may include installing an agent using byte code instrumentation as discussed above with respect to FIGS. 1 and 2. Next, ABAP application agent 350 is configured to communicate with ABAP application server 340 at step 630. Configuring ABAP agent 350 may include installing the agent on a device which is in communication with ABAP application server 340. In some embodiments, the ABAP agent may be installed on ABAP application server 340 itself. In some embodiments, the ABAP agent may be configured before the function is imported to ABAP application server 340 at step 610, and ABAP agent 350 may import the function to the ABAP application server.

An initialization method is performed by Java application agent 338 at step 640. The initialization may configure initial files for correlating performance data and performing other tasks. Performing an initialization method by agent 338 is discussed in more detail below with respect to FIG. 7.

Figure 7:
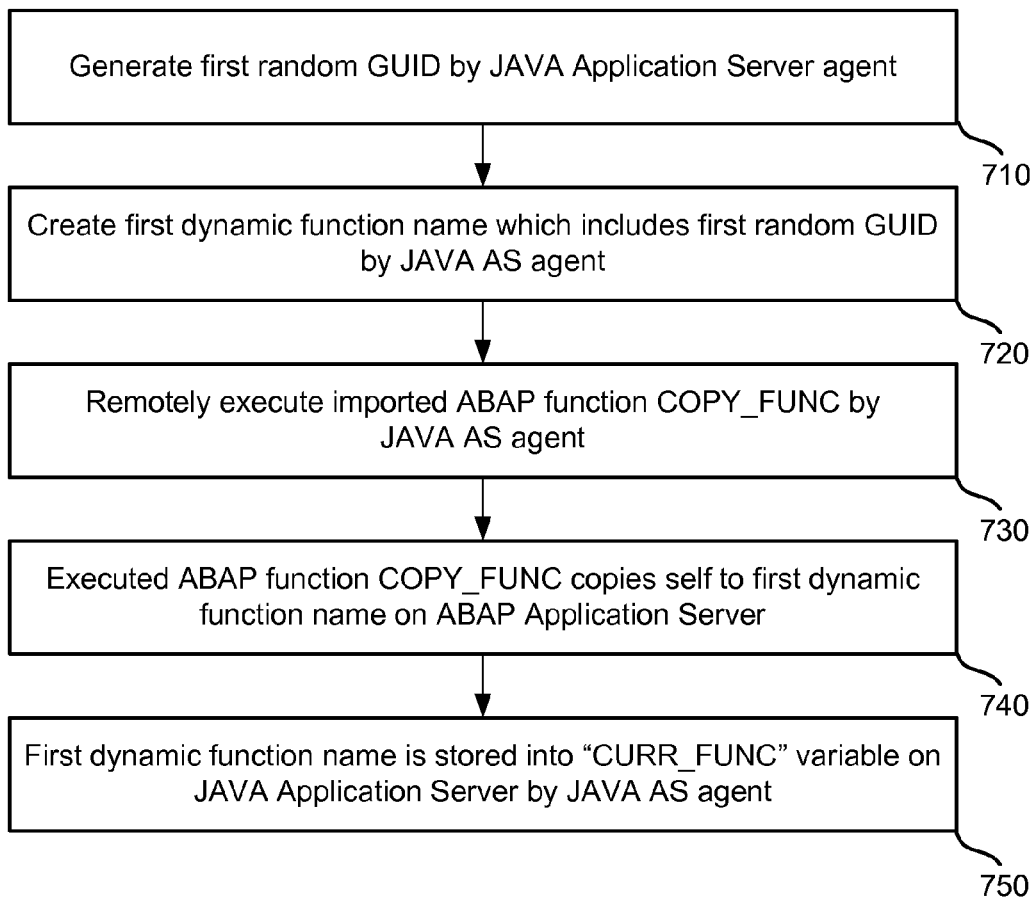
FIG. 7 is a flowchart of an embodiment of a method for performing initialization by an agent.

FIG. 7 is a flowchart of an embodiment of a method for performing initialization by an agent. In some embodiments, the method of FIG. 7 provides more detail for step 640 of the method of FIG. 6. First, a first random GUID is generated by agent 338 at step 710. The random GUID may be a string of text, an integer or some other random identifier. The random GUID may be used as a transaction identifier to identify performance data, SSR records, and/or other data associated with an SAP transaction. For example, the first random GUID can be the test string "ABC."

After generating the first random GUID, a first dynamic function name which includes the first random GUID is created by agent 338 at step 720. In some embodiments, the dynamic function name may be a constant or fixed string followed by the first random GUID generated at step 710. For example, the fixed string may be "DYN_FUNC" and the dynamic function name could be "DYN_FUNC_ABC." After creating the first dynamic function name, the imported ABAP function "COPY_FUNC" is remotely executed by the Java application agent 338 at step 730. The agent may remotely execute the ABAP function to copy the function into another function. At step 740, the ABAP function makes a copy of itself on the ABAP application server where the copy has the name of the first dynamic function name. Thus, a function would be generated on the ABAP server with a name of "DYN_FUNC_ABC" (the dynamic function name) and contain the same functionality as "COPY_FUNC." Next, the dynamic function name is stored into a variable on the Java application server by the agent 338 at step 750. The variable may indicate a current function, and for example be named "CURR_FUNC."

As a result of the method of FIG. 7, a variable named "CURR_FUNC" is stored in the JAVA application and "DYN_FUNC_ABC" is the dynamic function name stored as variable value in the JAVA application.

Thus, if a call is made from the JAVA application to execute the function stored in the CURR_FUNC variable in the JAVA application, the function DYN_FUNC_ABC function name would be retrieved as the value of the variable and executed at the ABAP application server, which would result in executing the same functionality as COPY_FUNC function at the ABAP server.

Figure 8:
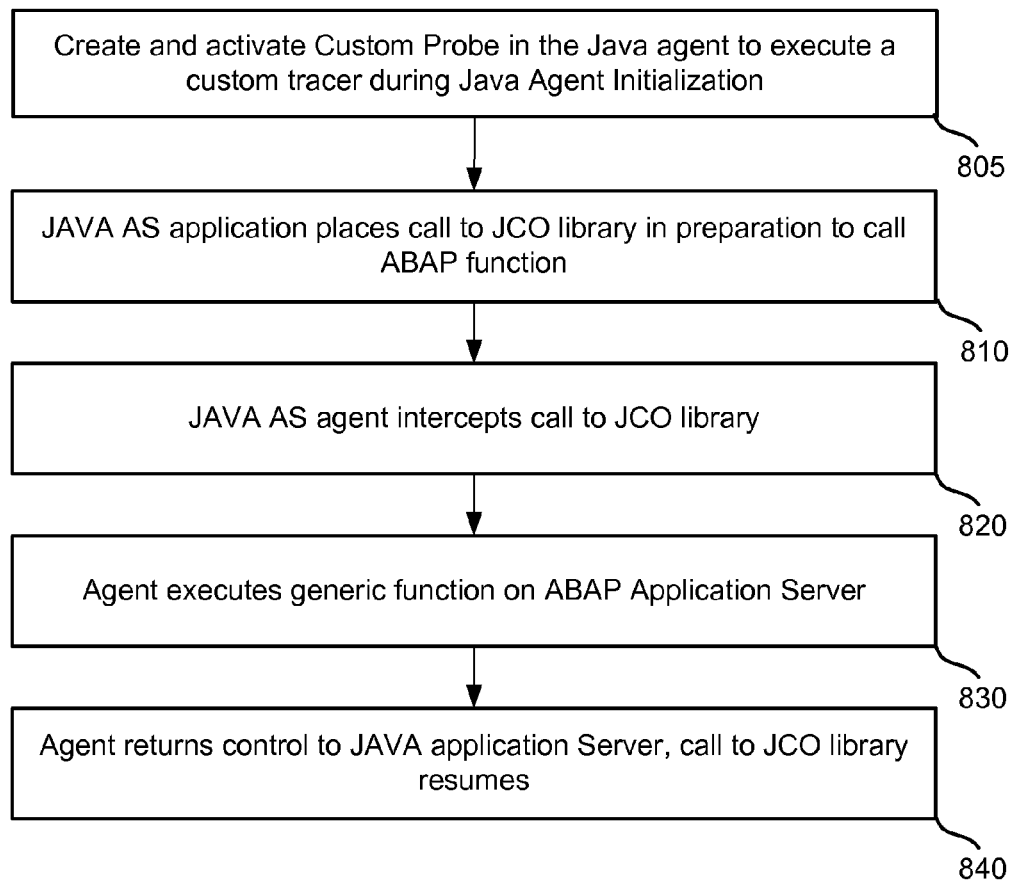
FIG. 8 is a flowchart of an embodiment of a method for intercepting a call to an ABAP server.

FIG. 8 is a flowchart of an embodiment of a method for intercepting a call to an ABAP server. In some embodiments, the method of FIG. 8 provides more detail for step 540 of the method of FIG. 5. In step 805, a custom tracer is initialized which will trace calls to the SAP JCO library as part of the Java Agent initialization.

At step 530 in the method of FIG. 5, it was determined that the client request requires an ABAP application to complete a transaction. In order to call any method in the ABAP application, the method name must be retrieved from a JCO library stored at Java server 330. Java application 336 places a call to a JCO library in preparation to call an ABAP function on ABAP application server 340 at step 810. The method name may be retrieved from the library using a JCO.client.execute command, which calls the JCO library.

The call to the JCO library is intercepted at step 820. The call may use the JCO.client.execute command and is intercepted by one or more probes inserted into application 336. In some embodiments, code inserted into application 336 intercepts the call to the library. The code may be inserted using byte code instrumentation as discussed above with respect to FIGS. 1 and 2.

After intercepting the call to the JCO library, agent 338 executes a generic function on ABAP application server 340 at step 830. When the generic function executes, a record is generated in SSR records 346 by ABAP application server 340. The name of the generic function is the dynamic function name which includes the correlation GUID, which correspondingly appears as the executed function name in the record. After executing the generic function at step 830, agent 338 returns control to Java application server 330 and the call to the JCO library resumes at step 840. In this case, the method of FIG. 5 continues from steps 540 to step 550.

Figure 9A:
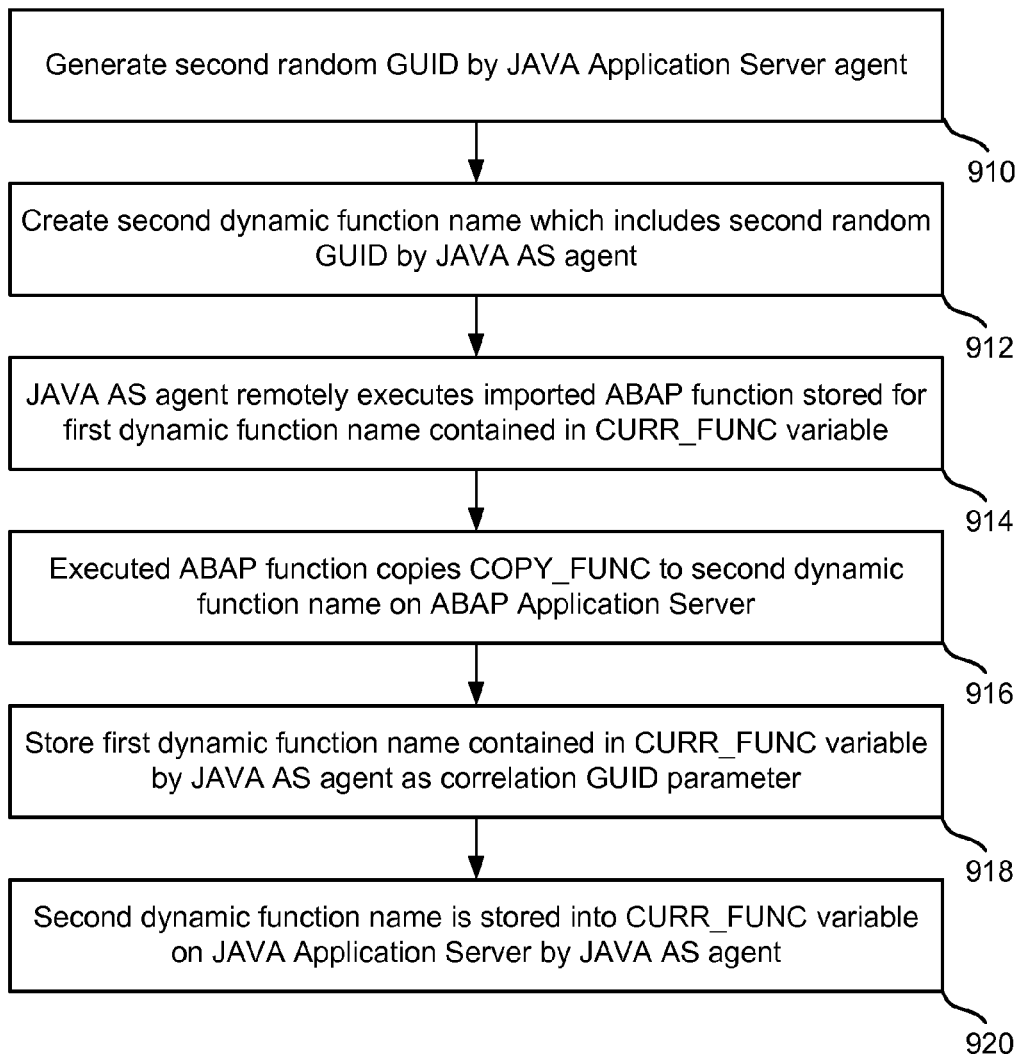
FIG. 9A is a flowchart of an embodiment of a method for executing a generic function on an ABAP application server.
Figure 9B:
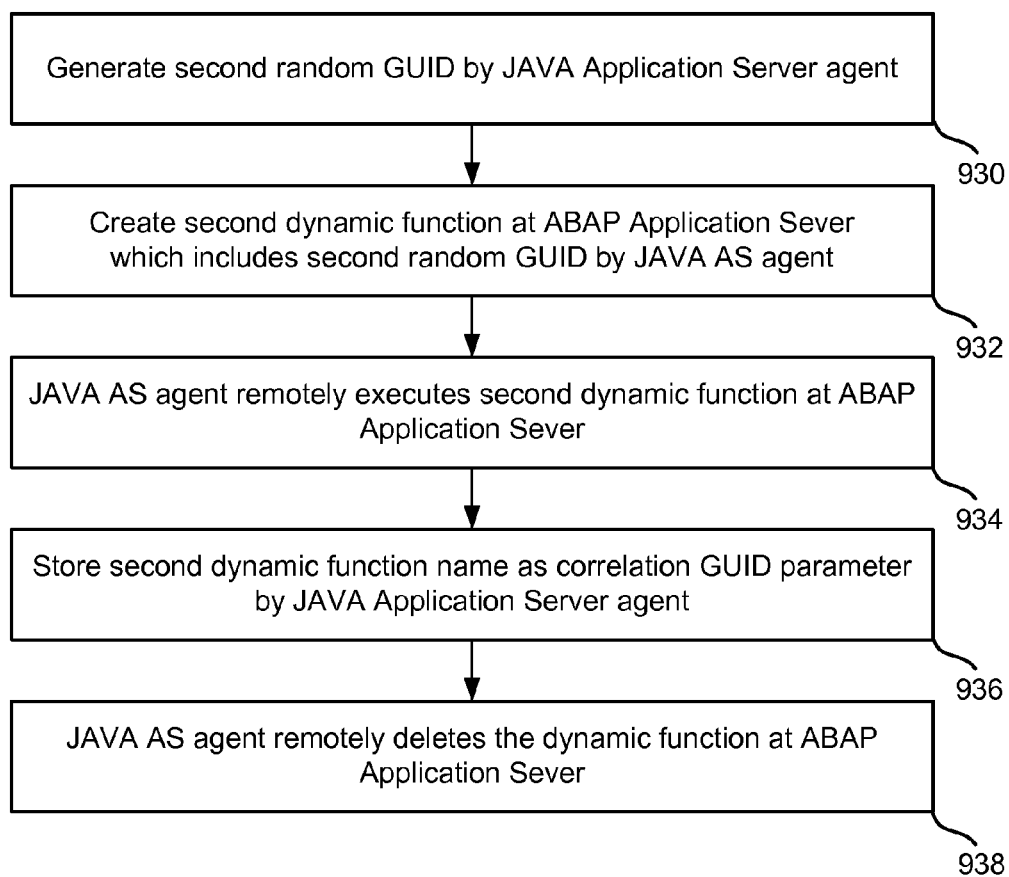
FIG. 9B is a flowchart of an embodiment of another method for executing a generic function on an ABAP application server.
Figure 9C:
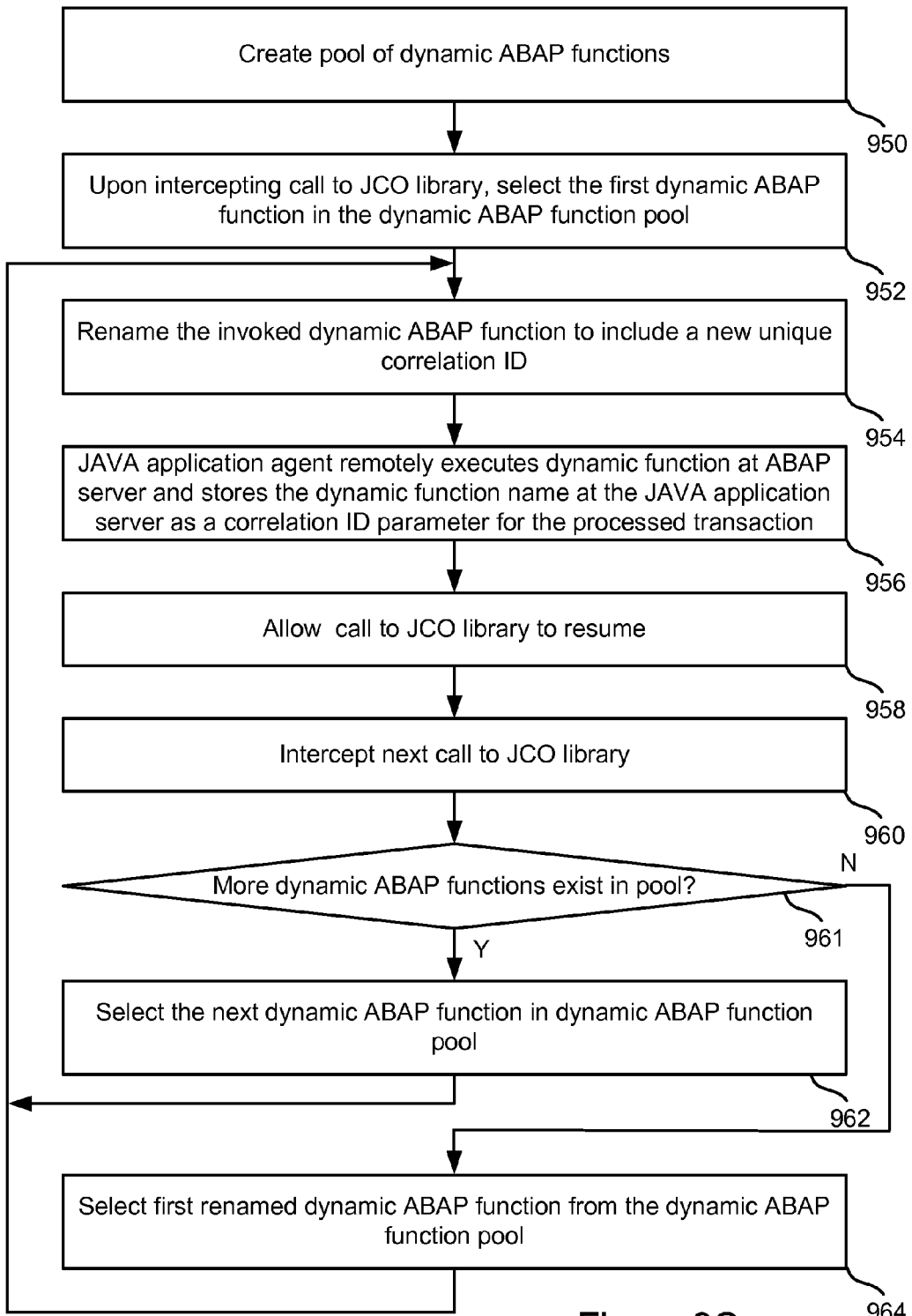
FIG. 9C is a flowchart of an embodiment of another method for executing a generic function on an ABAP application server.

Execution of a generic function on ABAP application server 340 as in step 840 may be implemented in several ways. For example, FIG. 9A illustrates a method which copies a generated function to a preexisting function for each transaction to perform. The method of FIG. 9B illustrates a method which adds and deletes a new function for each transaction performed by an ABAP application. The method of FIG. 9C illustrates a method for using a dynamic function pool for handling transaction which access ABAP application server 340. The methods of FIGS. 9A-9C are examples of how a generic function may be performed to place a record in the SSR records, where the function has a name which includes a correlation GUID that identifies a SAP transaction or other transaction that requires processing by applications on different platforms.

FIG. 9A is a flowchart of an embodiment of a method for executing a generic function on an ABAP application server. In some embodiments, the method of FIG. 9A provides more detail for step 830 of the method of FIG. 8. First, a second random GUID is generated by Java application agent 338 at step 910. Generating a second random GUID is similar to step 710 of the method of FIG. 7. For example, the second GUID could be the text string "IJK." After creating the second GUID, a second dynamic function name which includes the second random GUID is created by agent 338 at step 912. In some embodiments, the second dynamic function name is the same as the first dynamic function name generated at step 720 except the first GUID is replaced with the second GUID. For the example GUIID of "IJK," the second dynamic function name would be "DYN_FUNC_IJK."

JAVA application agent 338 remotely executes the imported ABAP function stored to the first dynamic function name contained in the "CURR_FUNC" variable at step 914. Thus, the dynamic function name stored in the current variable is called by sending a remote execution call to the ABAP application server 340 by agent 338, to copy ABAP function COPY_FUNC to the second dynamic function name on the ABAP application server 340 at step 916. The ABAP function is executed in response to the call of step 914. Execution of the function at step 916 is similar to the execution of the function at step 740 except that the function has a different function name of "DYN_FUNC_IJK."

The first dynamic function name contained in the CURR_FUNC variable is stored by agent 338 as a correlation GUID parameter at step 918. In this step, the correlation GUID parameter is stored in the performance data generated for Java components that process the multi-platform transaction, such as a SAP transaction. After storing the first dynamic function name, the second dynamic function name is stored into the CURR_FUNC variable on the Java application server by agent 338 at step 920. This prepares the monitoring system for processing the next transaction that requires components of the Java applications and ABAP applications to process the transaction.

FIG. 9B is a flowchart of an embodiment of another method for executing a generic function on an ABAP application server by creating and deleting a dynamic function on the ABAP server for each multi-platform transaction. FIG. 9B provides more detail for step 830 of the method of FIG. 8. First, a second random GUID is generated by Java application agent 338 at step 930. Next, a second dynamic function is created at ABAP application server 340 which includes the second random GUID generated by Java application agent 338 at step 932. Agent 338 then remotely executes the second dynamic function at ABAP application server 340 at step 934. Remotely executing the second dynamic function at the ABAP application server results in generating a record that appears in the SSR records with the second dynamic function name (which includes the second random GUID which was generated at step 930).

After remotely executing the second dynamic function, the second dynamic function name is stored as a correlation GUID parameter by Java application agent 338 at step 936. Storing the dynamic function name by the agent of a GUID parameter may allow the agent to associate the GUID parameter with performance data for JAVA application components that perform the SAP transaction or other multi-platform transaction.

After storing the second dynamic function name by the agent, the agent remotely deletes the dynamic function at the ABAP application server at step 938. Thus, rather than store a second function name as in the method of FIG. 9A, agent 338 deletes the dynamic function at the ABAP application server. Agent 338 will create (and delete) a new function with a correlation ID for each transaction which spans both application servers.

FIG. 9C is a flowchart of an embodiment of another method for executing a generic function on an ABAP application server by managing a pool of dynamic functions. The method of FIG. 9C provides more detail for step 830 of the method of FIG. 8. First, a pool of dynamic ABAP functions is created at step 950. For example, the pool may have twenty dynamic ABAP functions. Upon intercepting a call to the JCO library, the first dynamic ABAP function may be selected from the dynamic ABAP function pool at step 952. The selected dynamic ABAP function may then be renamed to include a new unique correlation ID or GUID at step 954. For example, a selected dynamic ABAP function "DYN_FUNC" may be renamed to have name of "DYN_FUNC_IJK," wherein "IJK" is inserted as a random GUID for the selected dynamic ABAP function.

Agent 338 may remotely execute the dynamic function name at ABAP application server 340 and store the dynamic ABAP function name with the Java application agent as a correlation ID parameter for the transaction at step 956. This step is similar to steps 934 and 936 of the method of FIG. 9B. Next, the call to the JCO library is allowed to resume at step 958. Allowing the call to the JCO library to resume results in a call to an ABAP application to process the transaction. The ABAP application receives the call, processes the call and provides a response to the calling component of JAVA application 336.

Eventually, a next call to the JCO library is intercepted at step 960. After intercepting the next call to the library, a determination is made as to whether more dynamic ABAP functions exist in the dynamic ABAP function pool at step 961. If there are more dynamic ABAP functions in the pool, the next dynamic ABAP function is invoked at step 962 and the method of FIG. 9C returns to step 954 to rename the invoked dynamic ABAP function. If no additional dynamic ABAP functions exist in the pool, then the first renamed dynamic ABAP function is selected from the dynamic ABAP function pool at step 964. Thus, after all the dynamic functions have been used, the pool is recycled and the first dynamic ABAP function is selected to be used again. After selecting the first dynamic ABAP function at step 964, the method of FIG. 9C returns to step 954.

Figure 10:
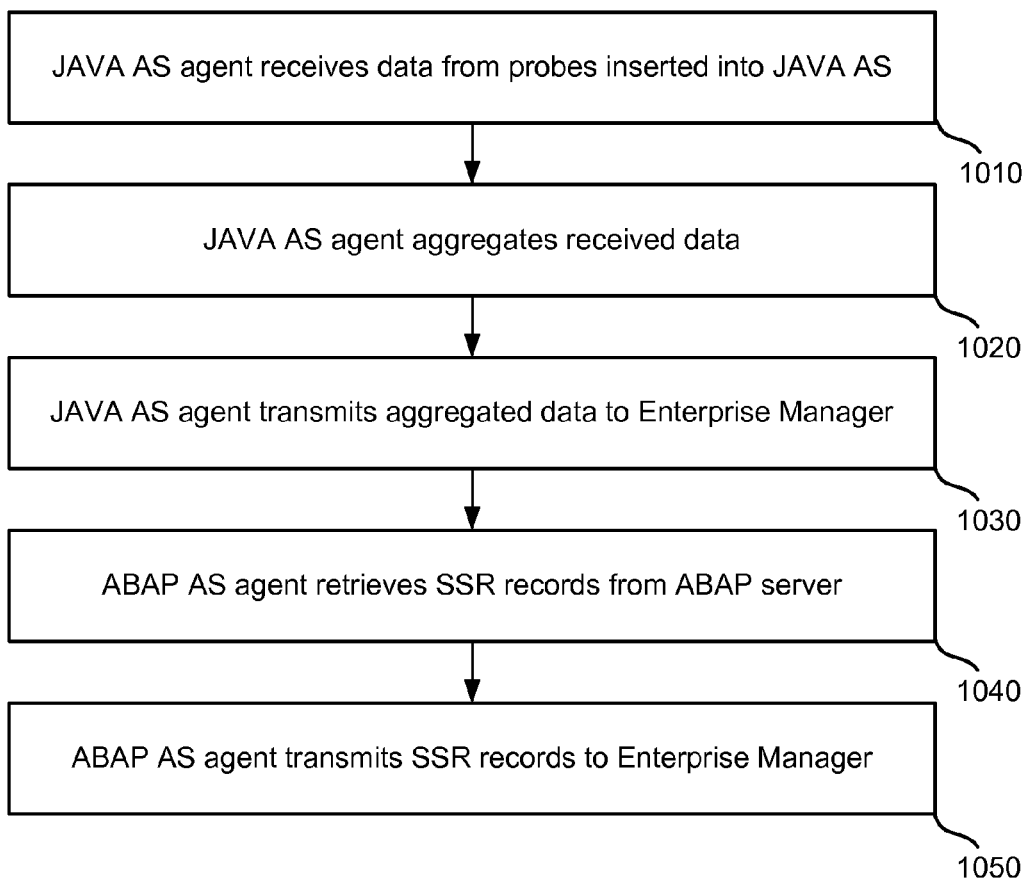
FIG. 10 is a flowchart of an embodiment of a method for accessing performance data by an enterprise manager for multiple application servers.

FIG. 10 is a flowchart of an embodiment of a method for accessing performance data by an enterprise manager for multiple application servers. In some embodiments, the flowchart of FIG. 10 provides more detail for step 560 of the method of FIG. 5. First, JAVA application agent 338 receives data from probes inserted into Java application server 110 at step 1010. Java application agent 338 then aggregates the received data at step 1020 and transmits the aggregated data to enterprise manager 360 at step 1030. In some embodiments, agent 338 may transmit the aggregated data every 15 seconds, at some other time period, or in response to some other event. The ABAP application agent 350 retrieves SSR records from ABAP server 330 at step 1040. To retrieve the SSR records, ABAP agent 350 sends a request to ABAP server 340 for the SSR records. ABAP server 340 receives the request, accesses the records and transmits the SSR records to ABAP application agent 350. After ABAP agent 350 receives the records, the agent transmits the SSR records to enterprise manager 360 at step 1050.

Figure 11:
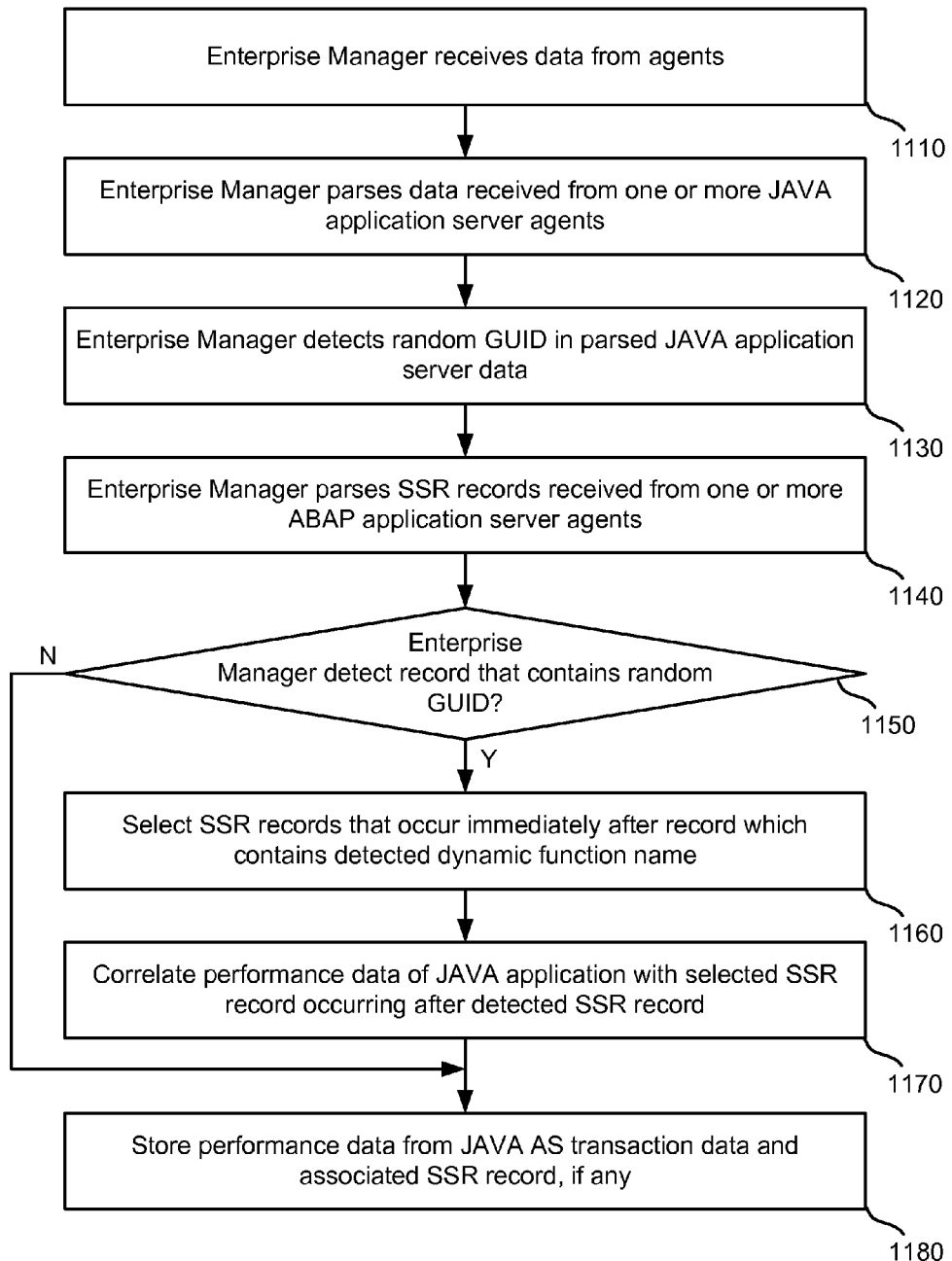
FIG. 11 is a flowchart of an embodiment of a method for correlating accessed performance data.

FIG. 11 is a flowchart of an embodiment of a method for correlating accessed performance data. In some embodiments, the method of FIG. 11 provides more detail for step 570 of the method of FIG. 5. First, enterprise manager 360 receives performance data from Java application agent 330 and ABAP application agent 350 at step 1110. Enterprise manager 360 then parses the received data from one or more Java application agents at step 1120. Enterprise manager 360 detects a random GUID in the parsed Java application data at step 1130. The random GUID may be part of a dynamic function name populated within the performance data as a correlation parameter or contained in the performance data received from a JAVA application agent in some other manner. In any case, the random GUID serves as a transaction identifier for identifying performance data associated with a particular multi-platform transaction, such as a particular SAP transaction.

After detecting the random GUID in the parsed Java application performance data, enterprise manager 360 parses the SSR records received from one or more ABAP application agents at step 1140. Enterprise manager 360 then determines whether or not a record is detected within the SSR records which contain the random GUID at step 1150. The random GUID may be contained in a dynamic function name within a particular record, for example a record for a function having a name of "DYN_FUNC_ABC." If the random GUID detected within the Java performance data is not detected in the SSR records, performance data is generated for the Java transaction data at step 1180. If the SSR records do contain the random GUID, the SSR record that occurs immediately after the record which contains the random GUID is selected at step 1160. The set of one or more records that contains the record with the random GUID is selected as the set of records that correspond to processing a SAP transaction (or other multi-platform transaction) by ABAP application 342. An example of a set of SSR records that contains a record with a dynamic function name with a random GUID is illustrated in FIG. 12.

After selecting the SSR records, the portion of the JAVA application performance data associated with the random GUID is correlated with the selected record of the SSR records at step 1170. The JAVA application performance data is correlated with the selected SSR record data such that a complete set of runtime performance data can be provided for the SAP transaction. The correlation may include bundling the complete set of runtime performance data for the SAP transaction.

After correlating the data, the complete set of runtime performance data may be stored at step 1180. The complete set of runtime performance data will include response time, application method or component names, and other data for each component, function or method that performs a task to complete the SAP transaction. As a result, the complete set of runtime performance data may provide the total time required to prosecute the transaction, the time taken to send requests and responses between the JAVA application and ABAP application, and time required by each application component to process the transaction. The data may be stored at database 250, within a cache of Enterprise Manager 360, or at some other location.

An example of a set of SSR records with a record for a dynamic function name is illustrated in FIG. 12. The SSR records of FIG. 12 include a record 1210 for a dynamic function name. Record 1210 is the second function in the list of records and includes a function name of "DYN_FUNC_ABC." Record 1220 corresponds to processing of a request initiated from a Java application server as part of a SAP transaction and occurs in the set containing record 1210. SSR records 1220 occurring in the set which contains the detected dynamic function name would be selected at step 1160 (in this case, record 1220 would be selected). After selecting the correct SSR record, the records are provided to the Enterprise Manager and correlated with performance data for the JAVA application transaction components which process the SAP transaction that corresponds to the selected record.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for reporting data, comprising:
providing a dynamic function name comprising a unique identifier at a first platform;
storing the dynamic function name in a variable at the first platform;
transmitting a request from the first platform to a second application at a second platform, the request comprises a request for the second application to generate a function whose name is the dynamic function name;
receiving, at a first application on the first platform, a request to perform a transaction, the request to perform the transaction is for a multi-platform transaction involving the second application;
in response to the request to perform the transaction, generating a call at the first application to a function which processes the request to perform the transaction, the function which processes the request to perform the transaction is at the second application;
intercepting the call;
obtaining the dynamic function name from the variable in response to the intercepting;
in response to the obtaining the dynamic function name from the variable, remotely executing the function whose name is the dynamic function name, causing the second application to generate a first record comprising the dynamic function name and associated performance data in a set of records;

after the remotely executing the function whose name is the dynamic function name, resuming the call to the function which processes the request to perform the transaction and thereby executing the function which processes the request to perform the transaction, causing the second application to generate, in the set of records, a second record comprising a name of the function which processes the request to perform the transaction and associated performance data, the second record does not comprise the unique identifier, and the second record is identifiable as corresponding to the transaction by the second record being immediately after the first record in the set of records; and generating performance data of the first application during the transaction and associating the unique identifier with the performance data of the first application.

2. The method of claim 1, wherein:
the function which processes the request to perform the transaction is specified in the request to perform the transaction.

3. The method of claim 1, wherein:
the intercepting the call occurs by code inserted into the first application.

4. The method of claim 1, wherein:
the request to generate the function whose name is the dynamic function name comprises the dynamic function name and a name of a copy function to be executed; and
the copy function is a function which copies itself into another specified function.

5. The method of claim 4, wherein:
the function whose name is the dynamic function name comprises a functionality of the copy function.

6. The method of claim 1, wherein the transmitting the request to generate a function whose name is the dynamic function name, from the first platform to the second application, occurs in an initialization process before the first application receives the request to perform the transaction.

7. The method of claim 1, wherein:
in response to the request to perform the transaction, determining that the second application is required to complete the transaction, the intercepting occurs in response to the determining that the second application is required to complete the transaction.

8. The method of claim 1, further comprising:
determining that the second application is required to complete the transaction responsive to the intercepting, the remotely executing the function whose name is the dynamic function name occurs in response to the determining that the second application is required to complete the transaction.

9. The method of claim 1, further comprising:
in response to the request to perform the transaction, generating a second call at the first application, the second call is to a second function which processes the request to perform the transaction, the second function is at the second application; and
without again remotely executing the function whose name is the dynamic function name, remotely executing the second function, causing the second application to generate, in the set of records, a third record comprising a name of the second function and associated performance data, the third record does not comprise the unique identifier, and the third record is identifiable as corresponding to the transaction by the third record being after the first record in the set of records.

10. The method of claim 1, wherein:
the dynamic function name comprises a fixed string and a random identifier; and
different dynamic function names are provided for different transactions using a combination of the fixed string and different random identifiers.

11. A computer program product, comprising:
a processor readable storage device having processor readable program code embodied therewith, the processor readable program code comprising:
processor readable program code configured to provide a dynamic function name comprising a unique identifier at a first platform;
processor readable program code configured to store the dynamic function name in a variable at the first platform;
processor readable program code configured to transmit a request from the first platform to a second application at a second platform, the request comprises a request for the second application to generate a function whose name is the dynamic function name;
processor readable program code configured to receive, at a first application on the first platform, a request to perform a transaction, the request to perform the transaction is for a multi-platform transaction involving the second application;
processor readable program code configured to, in response to the request to perform the transaction, generate a call at the first application to a function which processes the request to perform the transaction, the function which processes the request to perform the transaction is at the second application;
processor readable program code configured to intercept the call;
processor readable program code configured to obtain the dynamic function name from the variable in response to the intercepting;
processor readable program code configured to, in response to the obtaining the dynamic function name from the variable, remotely execute the function whose name is the dynamic function name, causing the second application to generate a first record comprising the dynamic function name and associated performance data in a set of records;
processor readable program code configured to, after the remotely executing the function whose name is the dynamic function name, resume the call to the function which processes the request to perform the transaction and thereby executing the function which processes the request to perform the transaction, causing the second application to generate, in the set of records, a second record comprising a name of the function which processes the request to perform the transaction and associated performance data, the second record does not comprise the unique identifier, and the second record is identifiable as corresponding to the transaction by the second record being immediately after the first record in the set of records; and
processor readable program code configured to generate performance data of the first application during the transaction and associate the unique identifier with the performance data of the first application.

12. The computer program product of claim 11, wherein: the function which processes the request to perform the transaction is specified in the request to perform the transaction.

13. The computer program product of claim 11, wherein: the intercepting the call occurs by code inserted into the first application.

14. The computer program product of claim 11, wherein: the request to generate the function whose name is the dynamic function name comprises the dynamic function name and a name of a copy function to be executed; and the copy function is a function which copies itself into another specified function.

15. The computer program product of claim 14, wherein: the function whose name is the dynamic function name comprises a functionality of the copy function.

16. The computer program product of claim 11, wherein: the transmitting the request to generate a function whose name is the dynamic function name, from the first platform to the second application, occurs in an initialization process before the first application receives the request to perform the transaction.

17. The computer program product of claim 11, wherein the processor readable program code embodied on the processor readable storage device further comprises:
   processor readable program code configured to, in response to the request to perform the transaction, determine that the second application is required to complete the transaction, the intercepting occurs in response to the determining that the second application is required to complete the transaction.

18. The computer program product of claim 11, wherein the processor readable program code embodied on the processor readable storage device further comprises:
   processor readable program code configured to determine that the second application is required to complete the transaction responsive to the intercepting, the remotely executing the function whose name is the dynamic function name occurs in response to the determining that the second application is required to complete the transaction.

19. The computer program product of claim 11, wherein the processor readable program code embodied on the processor readable storage device further comprises:
   processor readable program code configured to, in response to the request to perform the transaction, generating a second call at the first application, the second call is to a second function which processes the request to perform the transaction, the second function is at the second application; and
   processor readable program code configured to, without again remotely executing the function whose name is the dynamic function name, remotely execute the second function, causing the second application to generate, in the set of records, a third record comprising a name of the second function and associated performance data, the third record does not comprise the unique identifier, and the third record is identifiable as corresponding to the transaction by the third record being after the first record in the set of records.

20. The computer program product of claim 11, wherein: the dynamic function name comprises a fixed string and a random identifier; and
different dynamic function names are provided for different transactions using a combination of the fixed string and different random identifiers.

* * * * *